April 26, 1927.                    H. Y. ARMSTRONG                    1,626,379
                                   WRAPPING MACHINE
                         Filed March 26, 1924        13 Sheets-Sheet 1
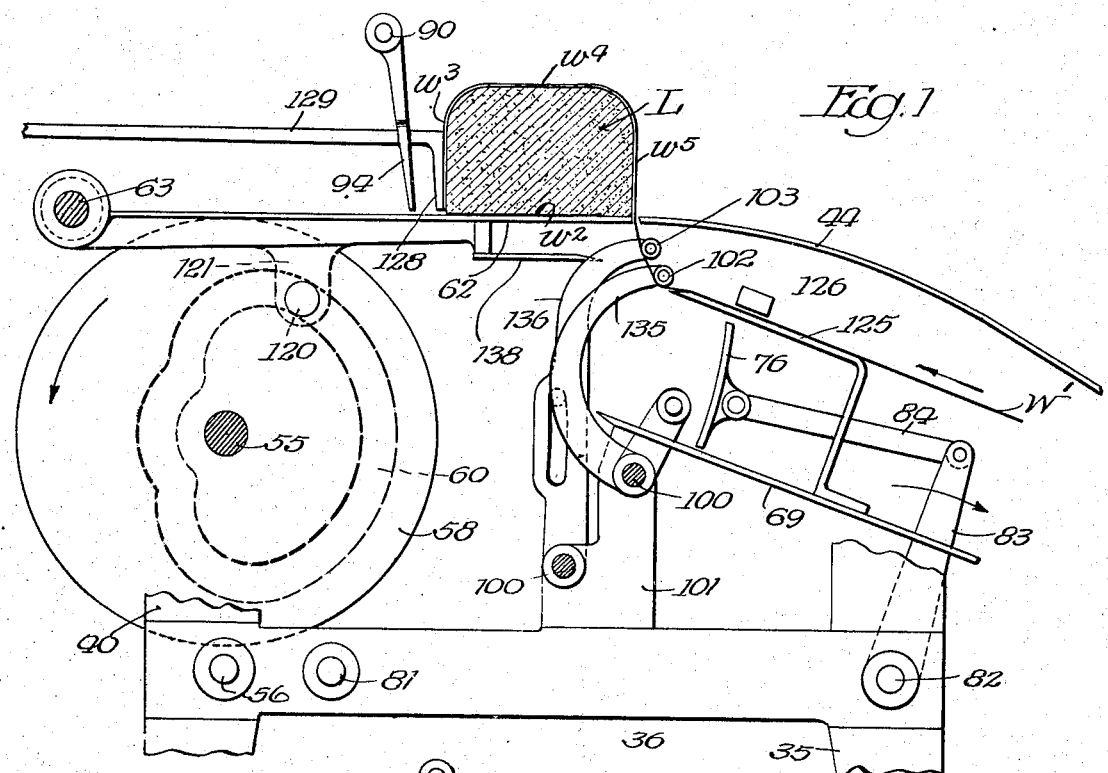
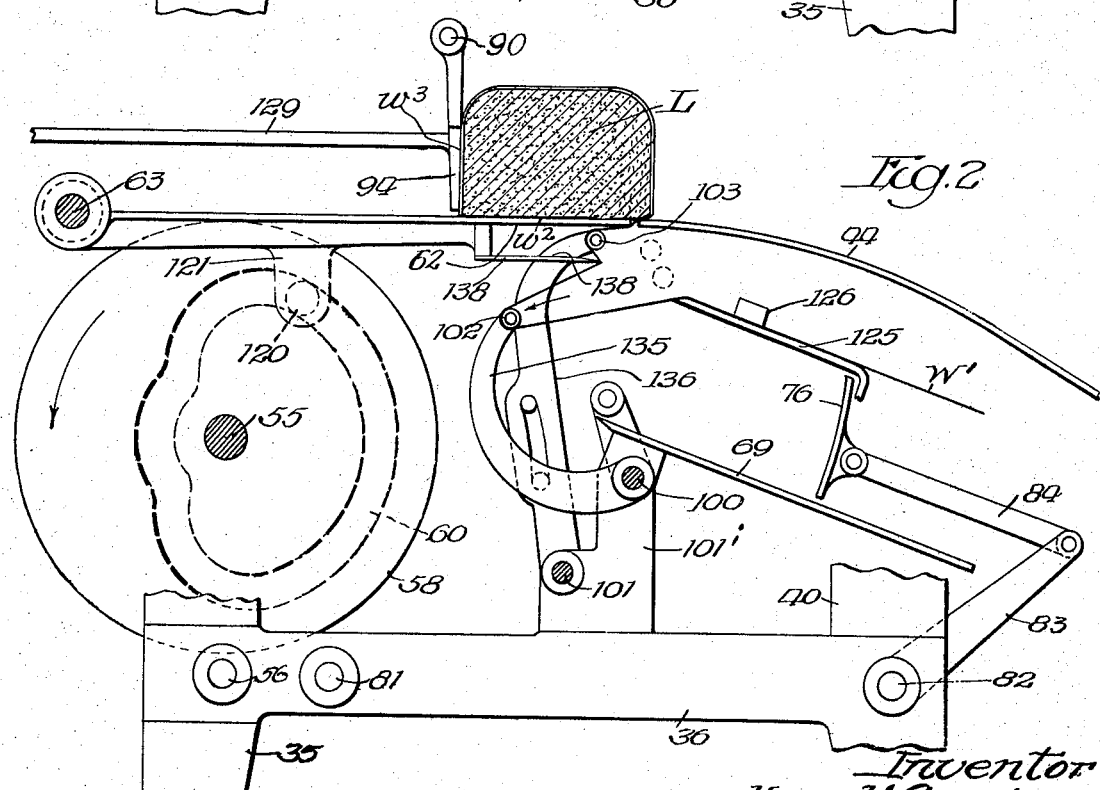
Inventor
Harry Y. Armstrong
By William H. Hall Atty.

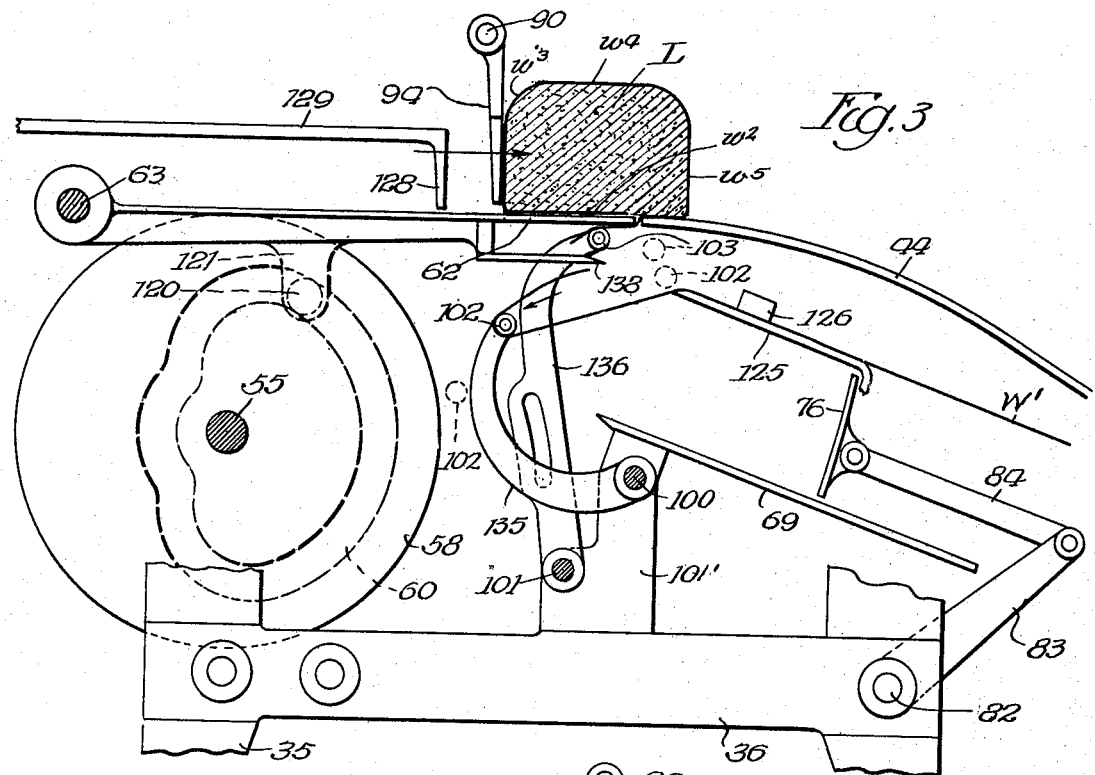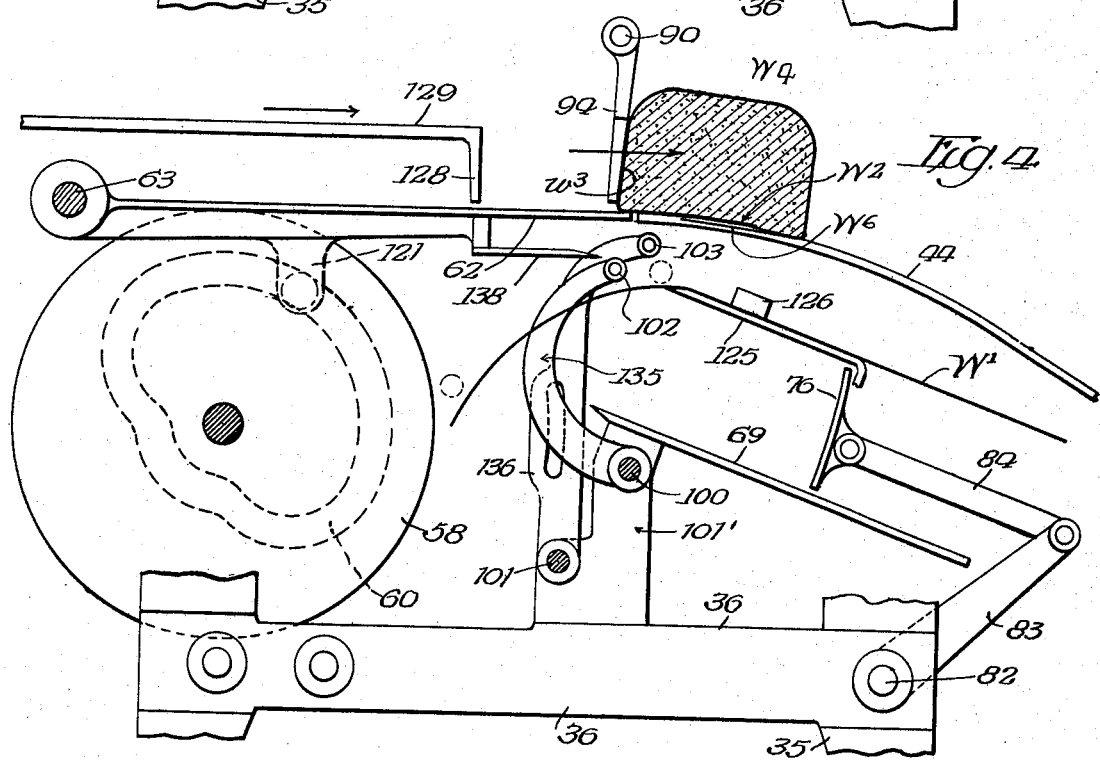

April 26, 1927.
H. Y. ARMSTRONG
1,626,379
WRAPPING MACHINE
Filed March 26, 1924
13 Sheets-Sheet 3
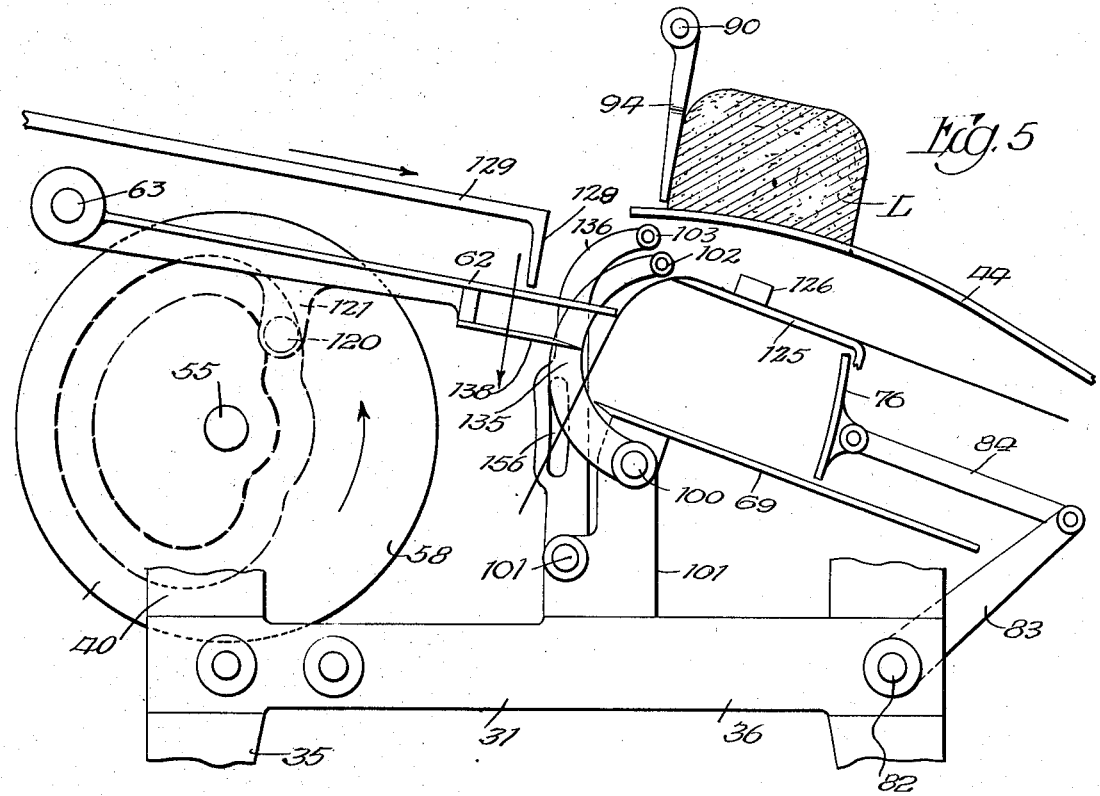
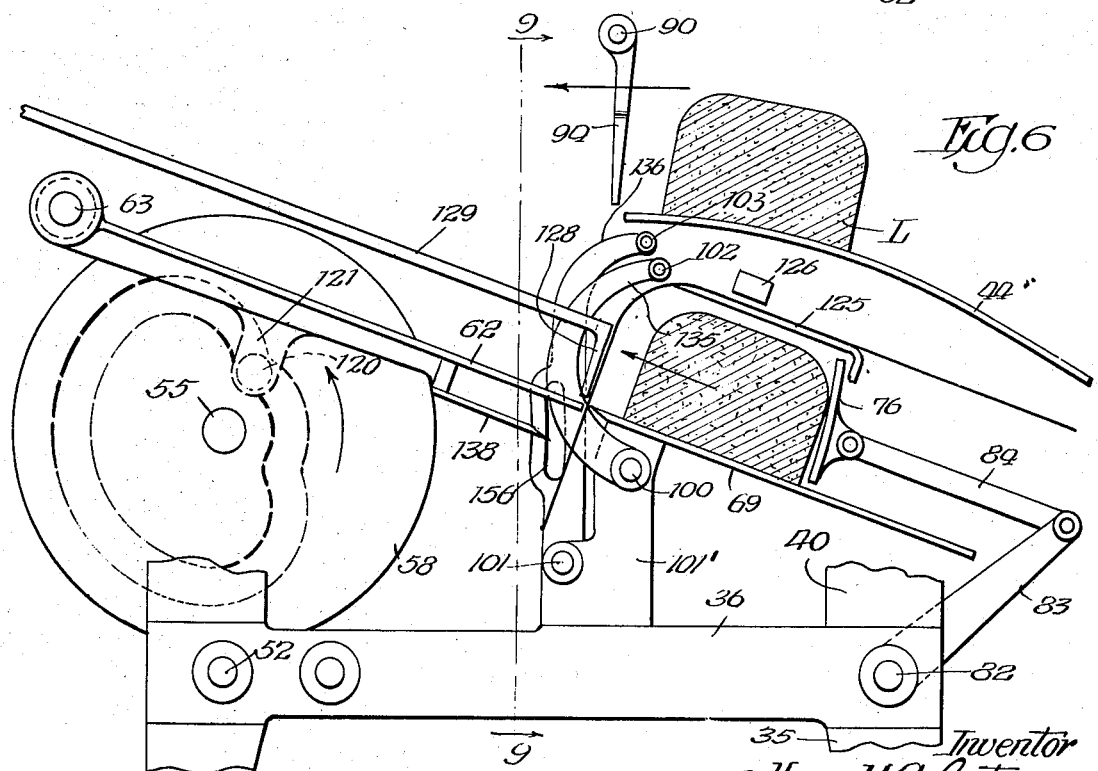

April 26, 1927.
H. Y. ARMSTRONG
1,626,379
WRAPPING MACHINE
Filed March 26, 1924
13 Sheets-Sheet 4
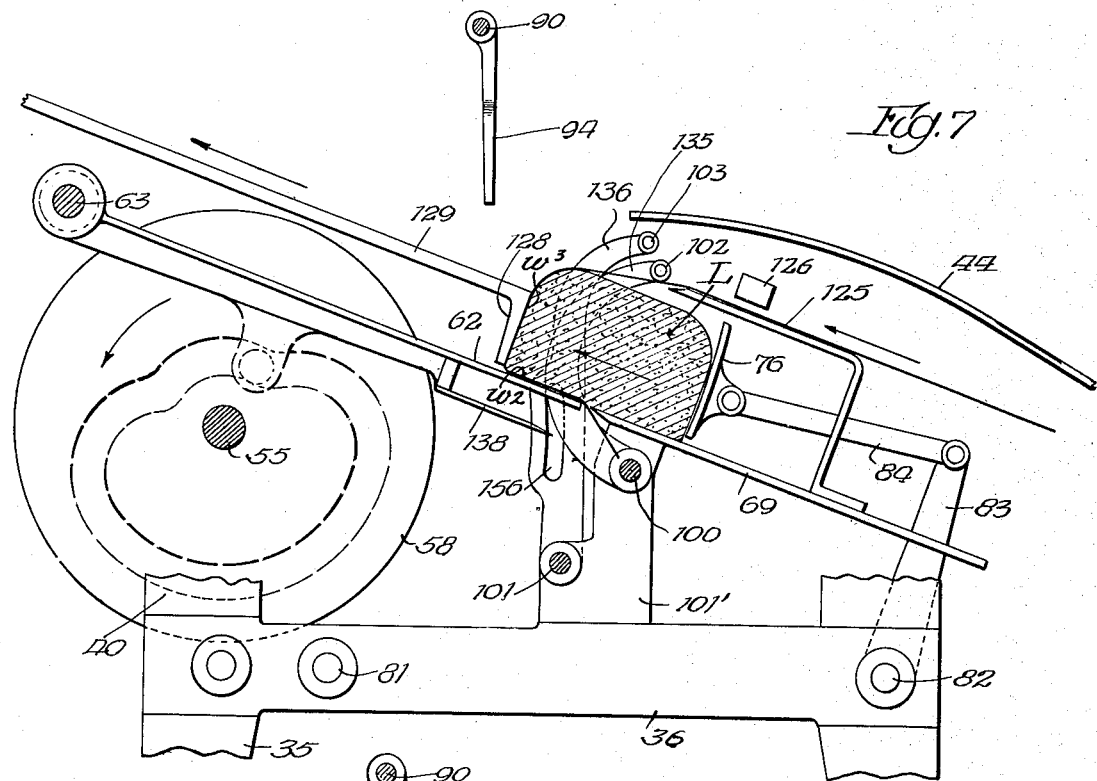
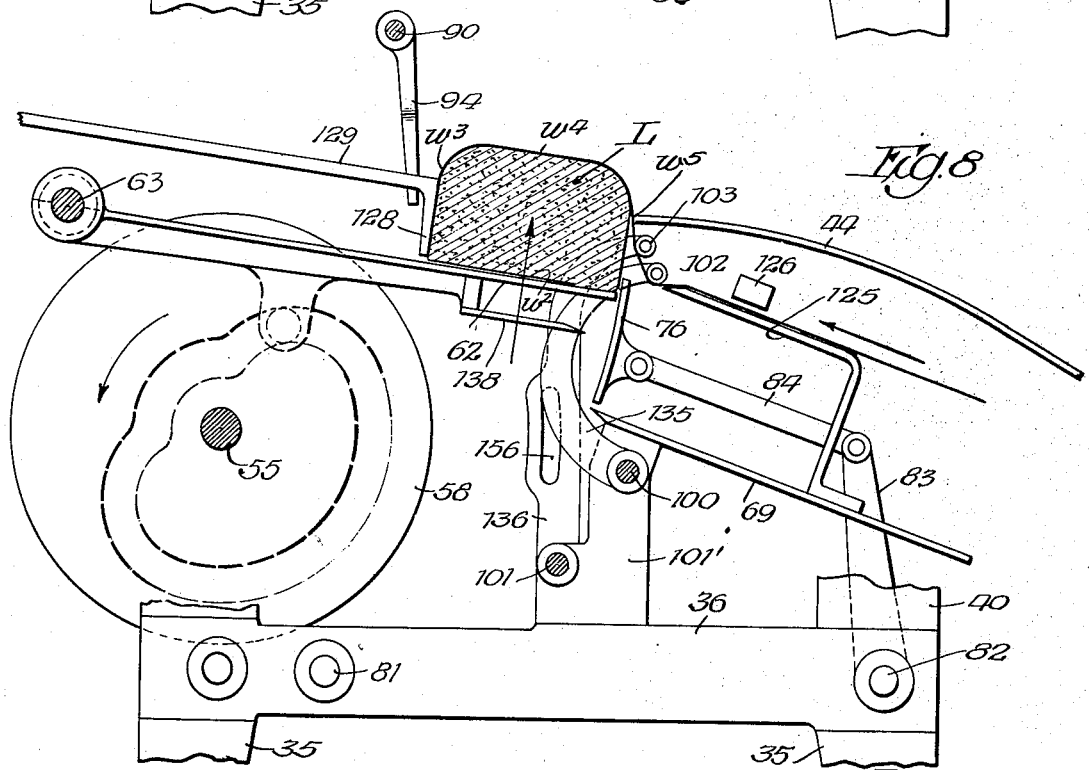
Inventor
Harry Y. Armstrong
By William L. Shea Atty

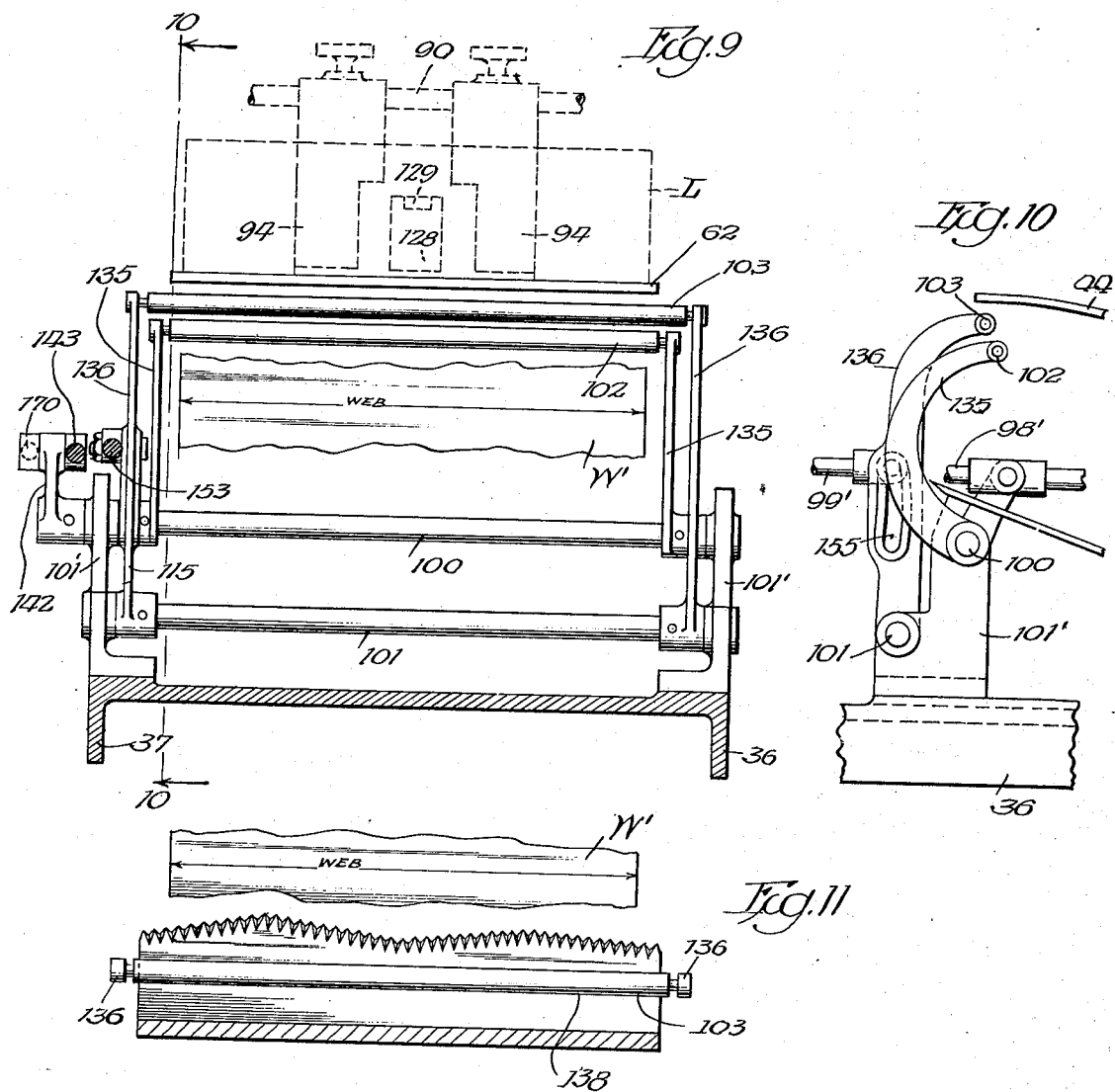

April 26, 1927.
H. Y. ARMSTRONG
1,626,379
WRAPPING MACHINE
Filed March 26, 1924    13 Sheets-Sheet 6
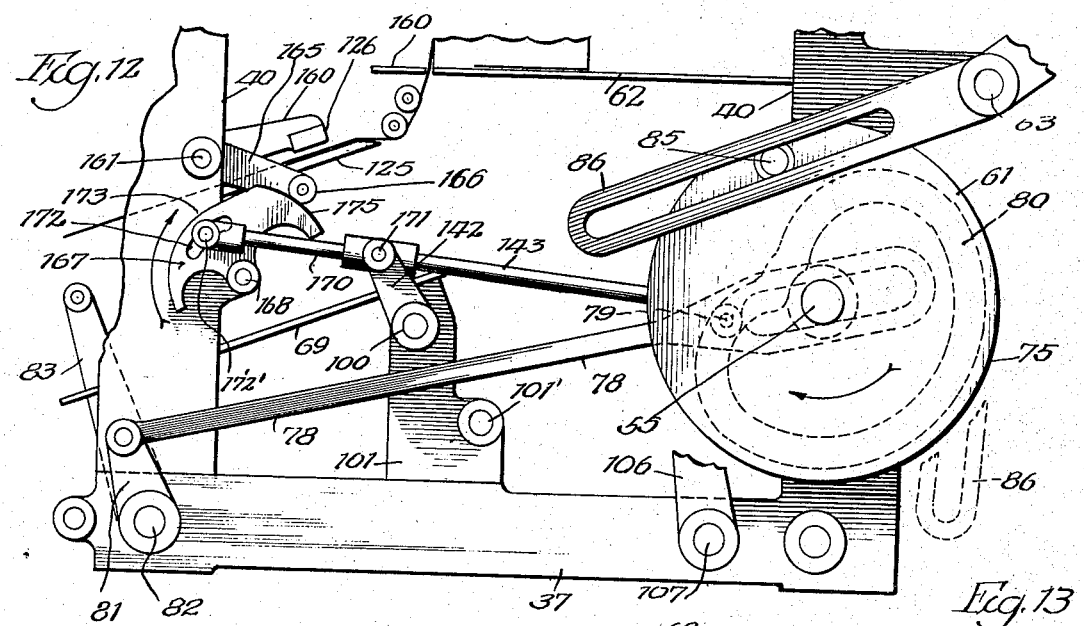
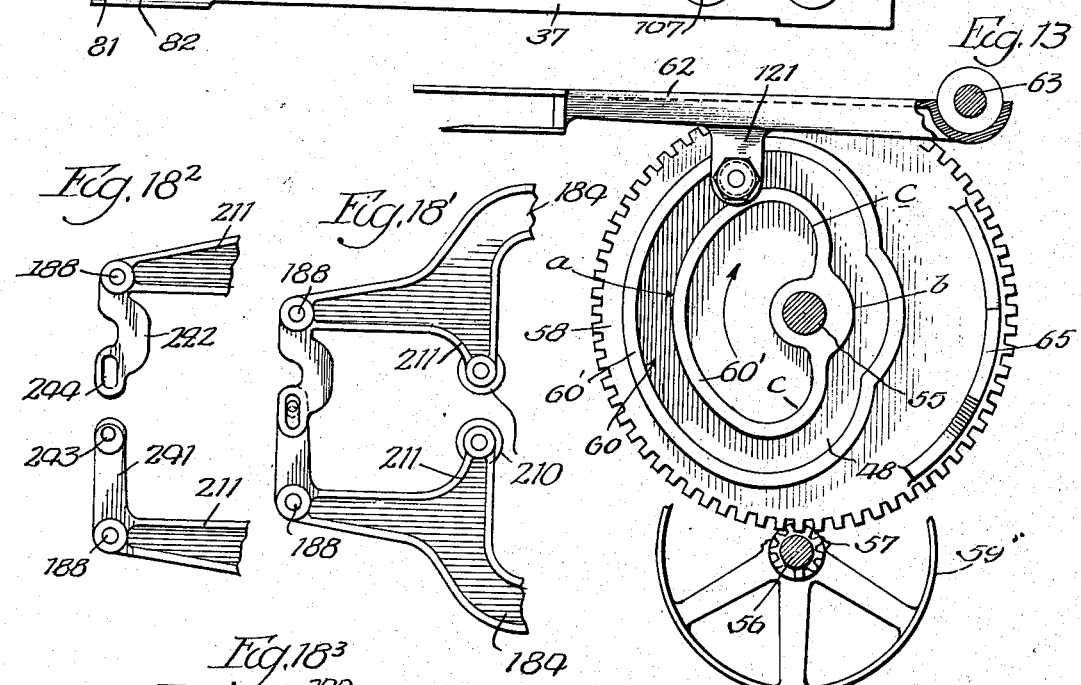
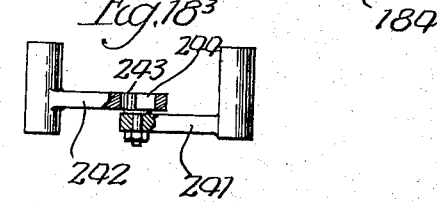
Inventor
Harry Y. Armstrong
By William H. Hall
Atty.

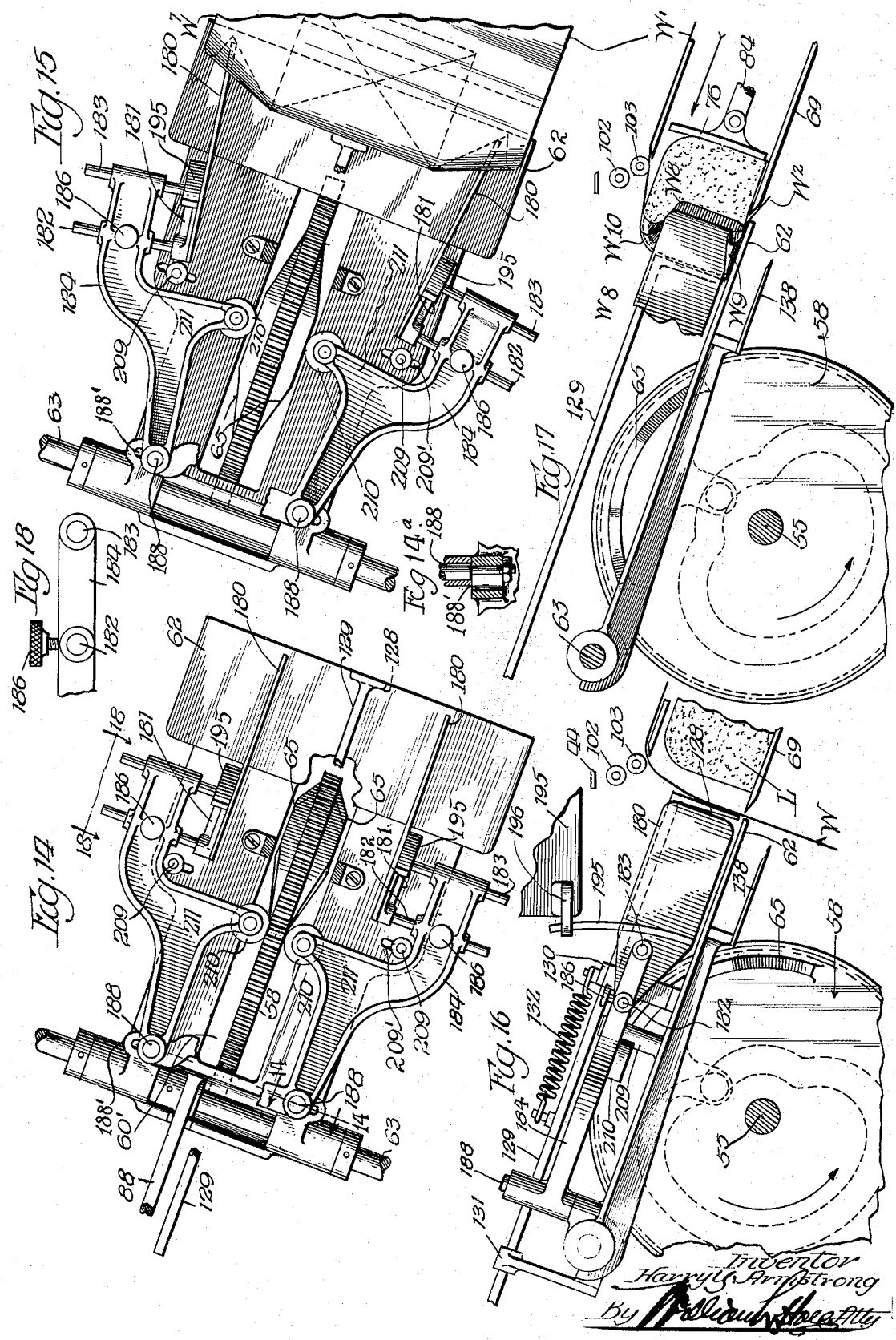

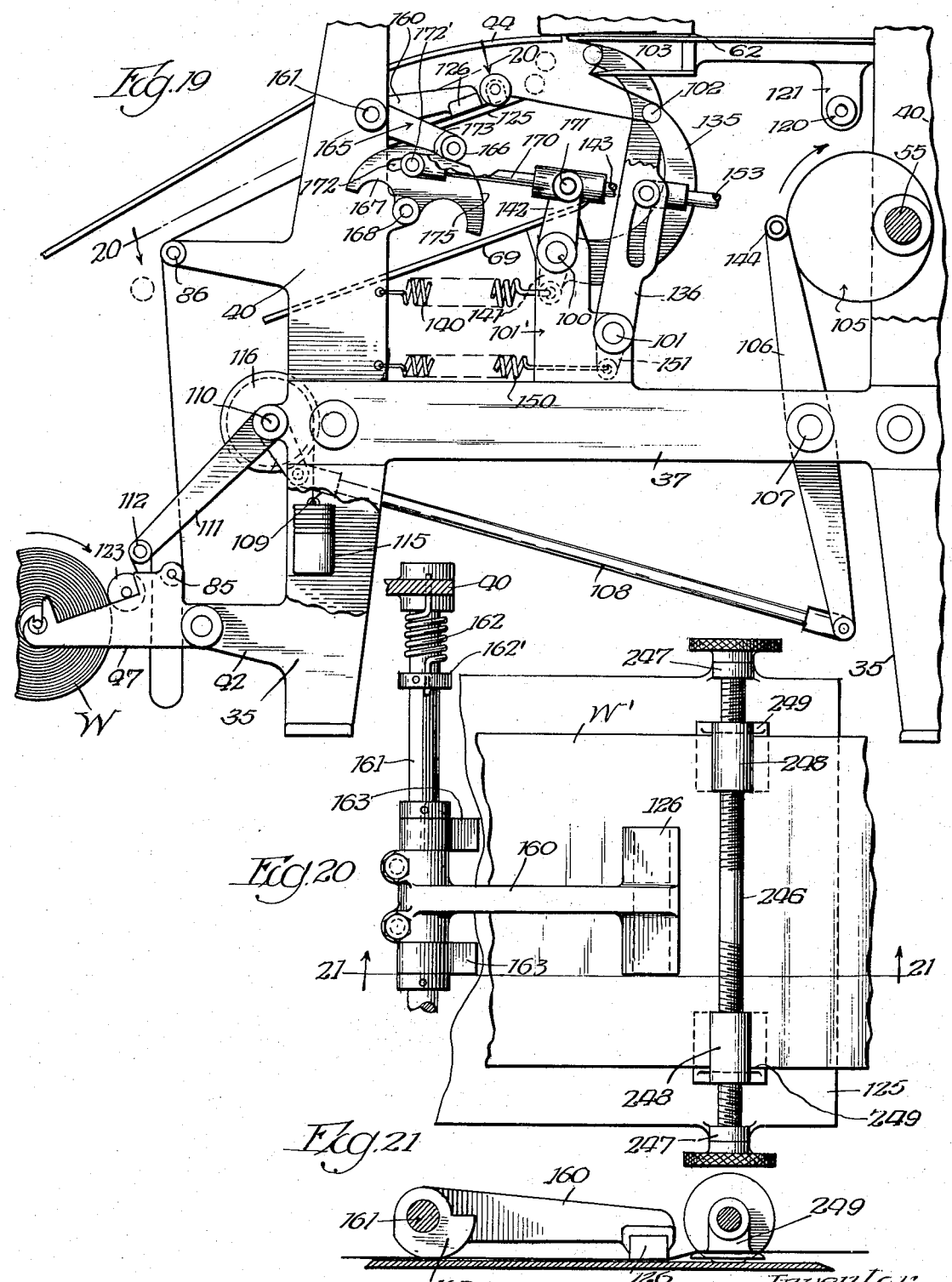

April 26, 1927.
H. Y. ARMSTRONG
1,626,379
WRAPPING MACHINE
Filed March 26, 1924    13 Sheets-Sheet 9
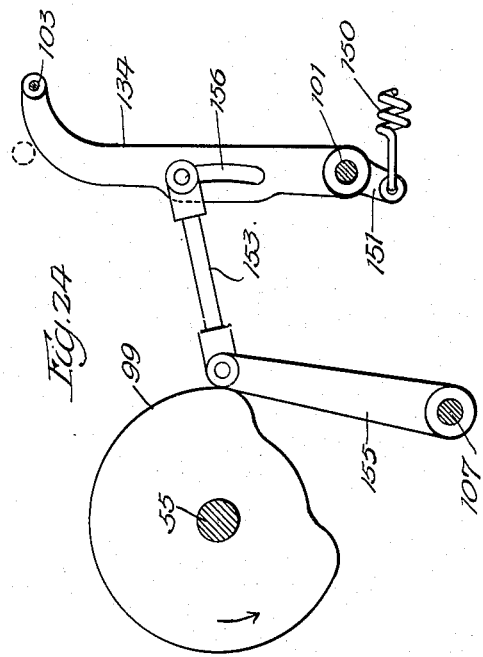
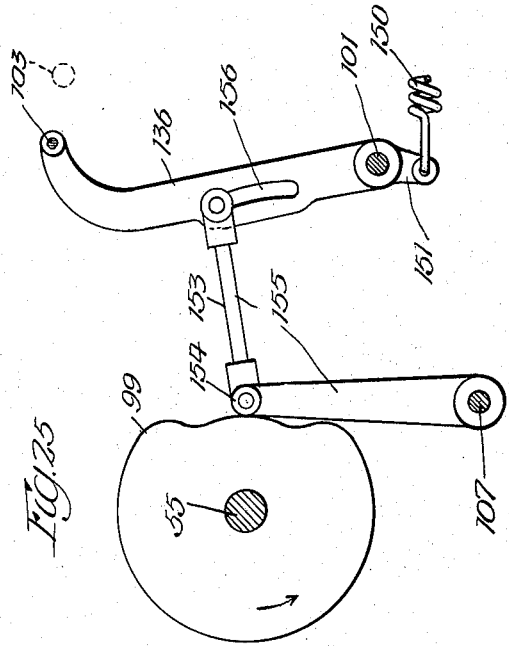
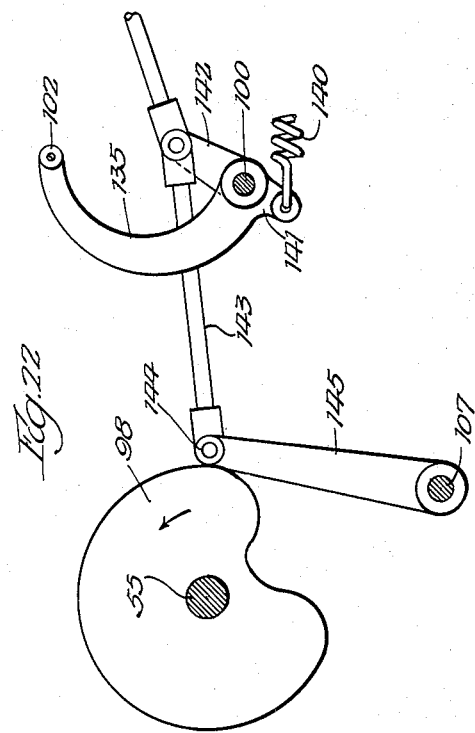
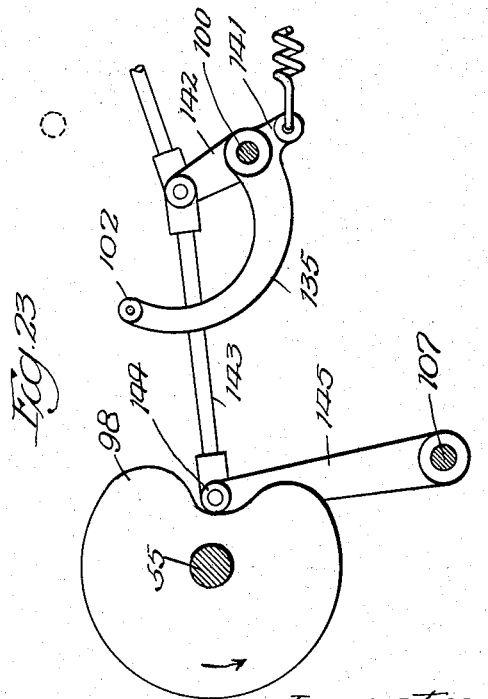

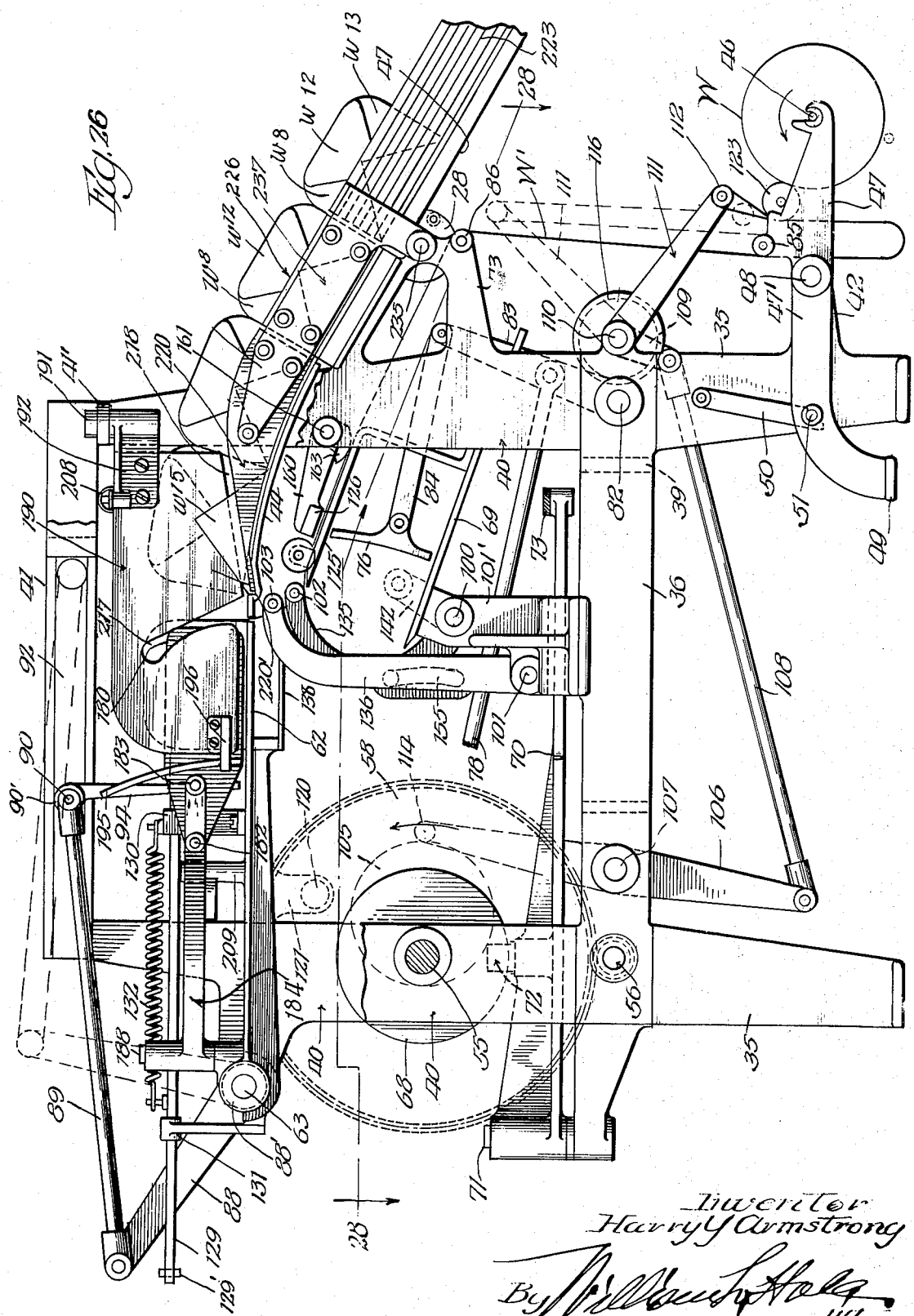

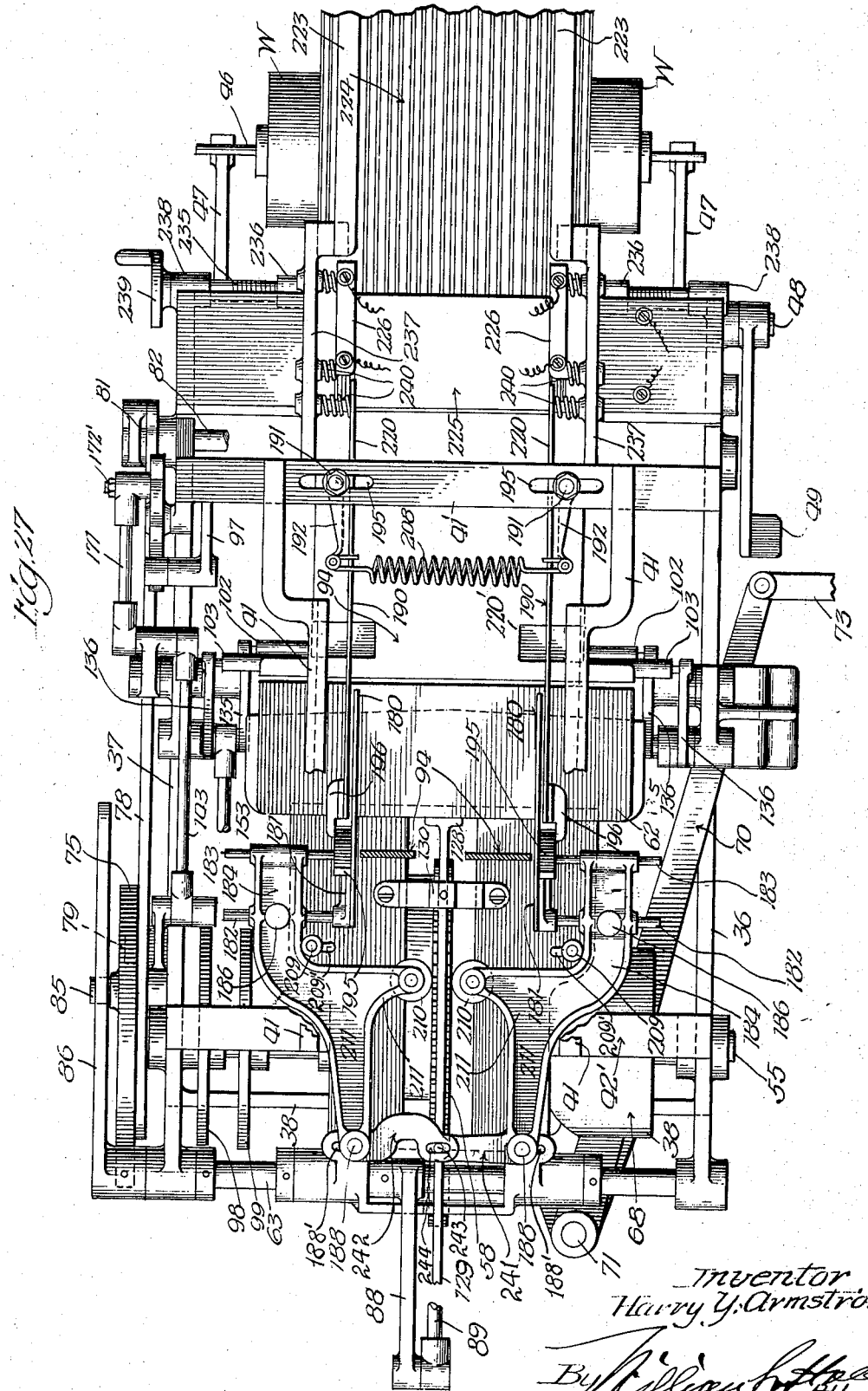

April 26, 1927.  H. Y. ARMSTRONG  1,626,379
WRAPPING MACHINE
Filed March 26, 1924    13 Sheets-Sheet 12
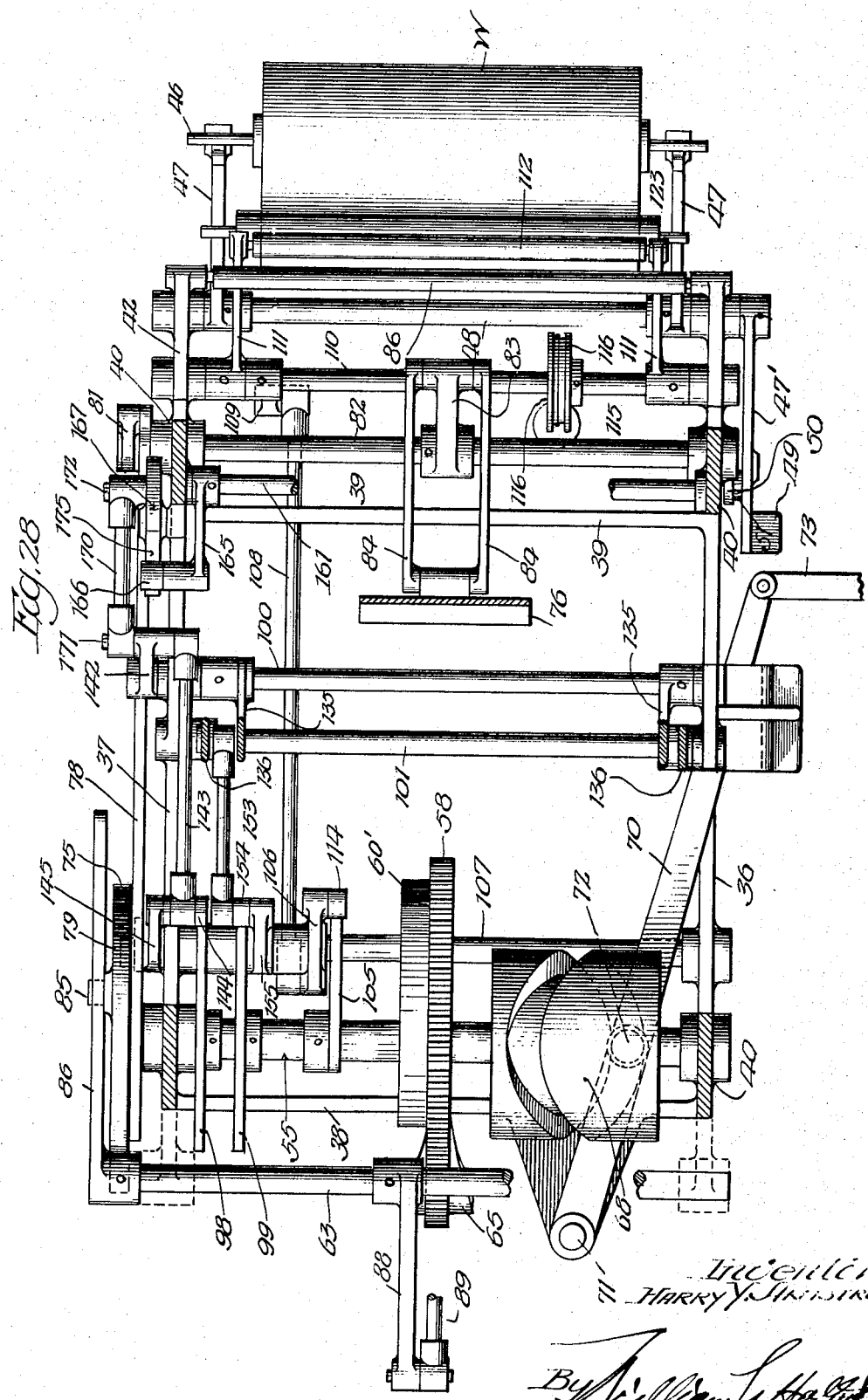

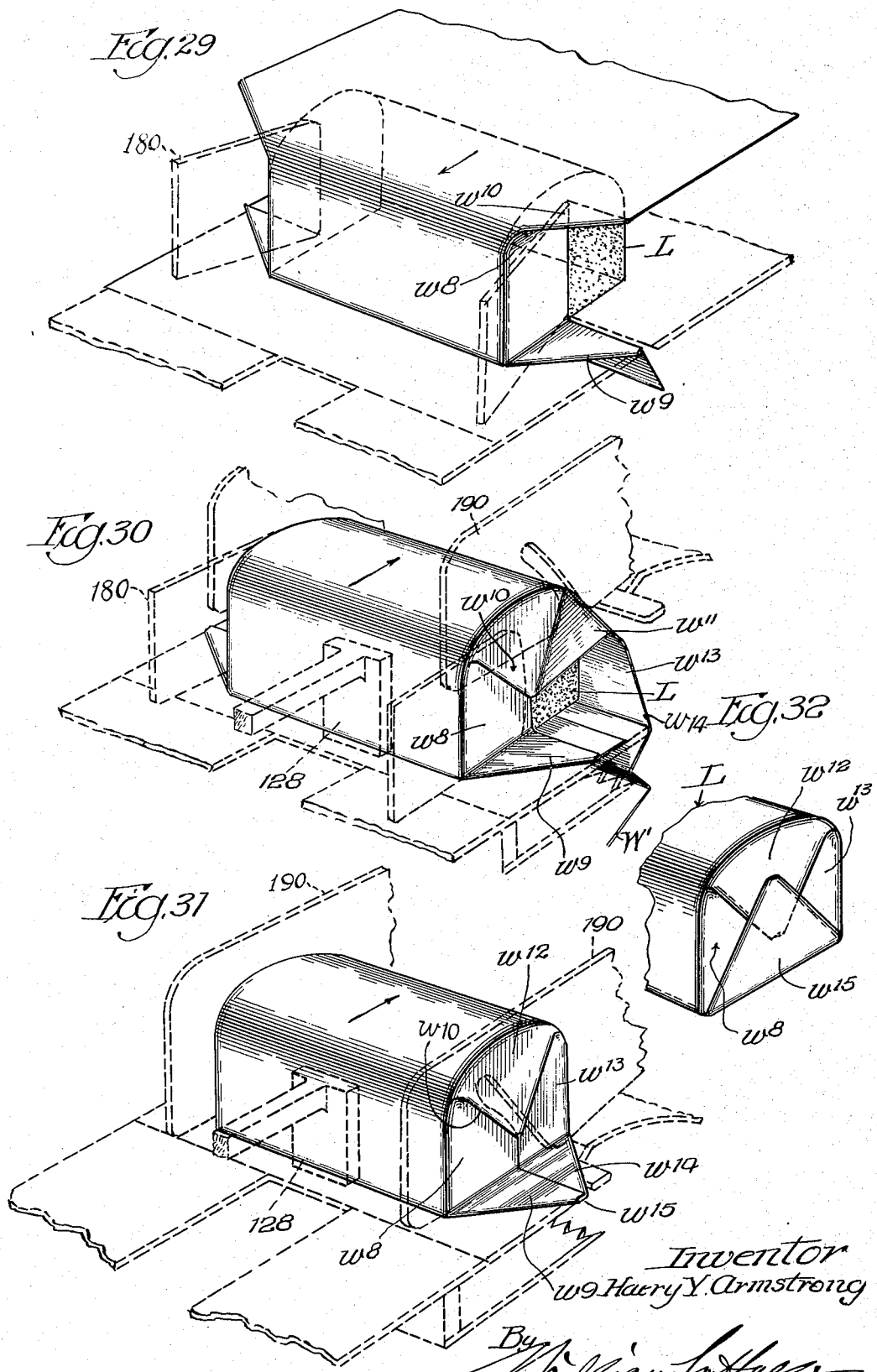

Patented Apr. 26, 1927.

1,626,379

UNITED STATES PATENT OFFICE.

HARRY Y. ARMSTRONG, OF SYRACUSE, NEW YORK, ASSIGNOR, BY MESNE ASSIGNMENTS, OF ONE-HALF TO AMERICAN MACHINE AND FOUNDRY COMPANY, A CORPORATION OF NEW JERSEY.

WRAPPING MACHINE.

Application filed March 26, 1924. Serial No. 702,007.

This invention relates to improvements in wrapping machines, designed in part for wrapping articles of variable dimensions and also of irregular contour by means which closely wraps the article in the free end of a web taken from a web roll or other source of web supply to produce a neat package with a minimum quantity of wrapper material commensurate with its dimensions and contour and for severing the web to produce a folded wrapper which is sealed, pasted or otherwise closed along overlapping folds to complete the package. The present invention is adaptable to machines which circumferentially wrap an article, with no end closing, and also for machines which end close the package by suitable flaps tucked up from extensions of the web and pressed against the ends of the package.

The present invention is, in part, broadly disclosed and claimed in my prior application for United States Letters Patent, Serial Number 542,541, filed March 10, 1922.

Among the objects of the present invention are to simplify the various mechanisms of the machine to reduce the cost thereof without sacrificing valuable utilities, but on the other hand to increase its efficiency, and to increase the range and the efficiency of adjustments to adapt the machine to wide ranges of dimensions of the articles to be wrapped in a given machine, merely by adjustments provided and without the necessity of redesigning or developing a machine to operate on different sizes and contours of articles, within limits, and to thus produce what may be aptly termed a universal wrapping machine.

To this end, one of the objects of the invention is to improve the mechanism for initially presenting the free end of the web to the article and for adjusting the length of the web end in which the article is to be wrapped to correspond with the circumferential dimensions thereof, and with the desired overlap of the terminal folds of the eventual wrapper which lap one on the other at one side of the article, as at the bottom, wherein they may be pasted, sealed or otherwise fastened together to close the wrapper on the article.

A further object of the invention is to improve the construction and operation of the end flap folding or tucking elements and the means which carry them, constructed to adapt the machine to wrapping articles of widely different lengths, within limits, such, for instance to lengths of known standard bread loaves, soap, confection bars, boxes, and the like, and to provide means which cooperate with the adjustable end tuckers or folders, or both, to center the articles of all practical lengths relatively to the longitudinal center axis of the machine, and thereby insure uniform end folding of the packages.

A further object of the invention is to provide means for varying the length of the last fold of the wrapper which overlaps the initial fold, and thereby provide for different lengths of the overlapping fold along which the wrapper is closed, suitable to meet the requirements of different users.

Another object of the invention is to construct and arrange the operating mechanism of the wrapped article discharge pusher or element in a way to simplify it and to reduce the length of stroke of said pusher.

The invention has for its further objects other improvements looking towards simplification of the web feed mechanism, the article moving mechanisms, and their co-operation, and to driving mechanism therefor, and the invention is pointed out in the appended claims.

In the present disclosure the terminal folds of the circumferential or side wrapper are brought together in overlapped relation at the bottom of the article, but it is understood that the said terminal folds may be assembled on another side of the article. The present disclosure, therefore, is not limiting but merely illustrative.

In Figures 9 to 13, inclusive, and in Figures 19 to 28, inclusive, of the drawings are diagrammatically indicated a suitable frame and the major operating mechanisms for respectively supporting and giving operative movements to the various elements of the wrapping mechanisms. In Figures 1 to 8 inclusive are diagrammatically shown the essential elements of the side wrapping, web control and the wrapped articles ejecting mechanism. In Figures 14 to 18³, inclusive are shown the means for forming and tucking the end flaps of the web and wrapper on the ends of the article and in connection with Figures 26 and 27, means for adjusting said elements to articles of different lengths.

In Figures 29, 30, 31 and 32 are diagrammatically illustrated the successive steps of the application of the wrapper web to the article in a cycle of movement of the web feed and wrapping operations, partly indicating the folding and tucking mechanisms in broken outline.

*As shown in the drawings:*

Figures 1 to 8 inclusive are diagrammatic views illustrating the essential elements for circumferentially wrapping the articles, with the parts in the different positions which they assume in a cycle of operation of the side wrapping mechanism.

Figure 9 is a section on the indicating line 9—9 of Figure 6, showing parts in dotted lines and other parts that do not appear in said Figure 6.

Figure 10 is a fragmentary elevation and cross section as seen from the indicating line 10—10 of Figure 9.

Figure 11 illustrates an approved form of knife for severing the wrapper from the web and indicating the severed edge of the web.

Figure 12 is a fragmentary detail, in side elevation, of parts at the left side of the machine, illustrating the means for adjusting the length of the web drawn out in the beginning of wrapping cycle.

Figure 13 is a detail illustrating the cam for giving movement to the article transfer element, equipped with other cam surfaces to give spreading movement to the end flap folding means.

Figure 14 is a plan view of the end flap folding tucker blades and their mounting, showing means for adjusting them to adapt the machine to different length articles.

Figure 14ª is a detail section on line 14—14 of Figure 14.

Figure 15 is a similar detail showing the blades in a different operative position.

Figure 16 is a side elevation of the parts shown in Figures 14 and 15, with the transfer element in its lowermost position.

Figure 17 is a fragmentary side view of the parts in the position shown in Figure 15.

Figure 18 is a detail, as seen from the indicating line 18—18 of Figure 14.

Figures 18¹, 18² and 18³ are details of an equalizer mechanism to maintain the article centrally in the endtucking and folding mechanism.

Figure 19 is a diagrammatic, fragmentary side elevation, illustrating the web feed control mechanisms and the parts associated therewith.

Figure 20 is a plan view on the general indicating line 20—20 of Figure 19, with parts omitted.

Figure 21 is a detail section on the line 21—21 of Figure 20.

Figures 22 to 25, inclusive, are diagrammatic views of the mechanisms and their operating cams for controlling the web feed and fold positioning rolls.

Figure 26 is a general side elevation of the principal parts of the machine, with some of the parts omitted.

Figure 27 is a plan view thereof with parts broken away.

Figure 28 is a horizontal section taken on the general line 28—28 of Figure 26.

Figures 29, 30, 31 and 32 separately and progressively illustrate the forming and finished package.

In the following description the rear end of the machine is that towards which the wrapped articles are discharged and the front end of the machine is that which carries the main countershaft and the various operating cams. These terms have been selected for the purpose of convenient identification and are merely descriptive, but not limitive.

*Machine frame:*

The frame shown in a diagrammatic way comprises standards 35; a skeleton bed, including side members 36 and 37 and end members 38, 39, and uprights 40 extending above the bed plane, and top side members 41 chiefly shown in Figures 26, 27 and 28 and incidentally shown in other figures. Said frame, however, may assume other forms and in practice will be such that it will support wrapping and web feed mechanisms designed to wrap articles varying in circumferential and length dimensions through wide ranges so that thereby the frame elements can be adapted to two or more sizes of wrapping and web feed mechanisms. The frame and said mechanisms thus may be said to possess universal characteristics and the parts of the machine can be made as stock parts and assembled for general dimension and shape wrapping to fill an order for that dimension, and without specially redesigning the machine to suit a package of a given shape or dimension.

42, 42 designates reel carrying arms to suport a roll W of a web wrapper material, and 43 (Figure 26) designates arms for partly carrying the rear portion of the runway 44 through which the wrapped packages are discharged. The shaft 46 of the web reel is rotatively supported in upwardly opening notches of reel carrying levers 47 that are pivoted to the frame through a rock shaft 48 supported by the arms 42. One of said levers 47 has an arm 47' and a foot piece 49 by which the levers carrying a roll may be swung upwardly, and a latch 50 pivoted to the frame engages a lug 51 on the foot piece arm 47' to hold the roll up, thus permitting the levers to drop at their rear ends to readily receive the ends of the reel shaft when loading the machine with a web roll.

Driving and operating mechanisms.

A rotative cam shaft 55 extends horizontally across the front end of the machine frame (Figure 28) and is driven by a driving shaft 56 (Figure 13), operative from any suitable source of power, through a pinion 57 and a peripherally toothed disc 58 fixed to and rotating with said cam shaft.

In one face of the disc 58 is formed, between inner and outer walls 60′, a track cam 60, having opposed high and low concentric portions *a*, *b*, and intermediate eccentric parts, *c*, *c*. It controls the operation of a transfer member 62 pivoted on a cross shaft 63, the transfer member being slotted to accommodate the top of said cam disc. Said transfer member receives at its rear end the partially wrapped articles to transfer them to the runway 44, as will hereinafter appear. Said disc 58 also carries on opposite side faces symmetrically disposed arc-shaped cam ribs 65 adapted to operate the end flap folding and tucking mechanism hereinafter set forth. Said cam shaft also carries near one end a cylinder cam 68 which may operate the mechanism which feeds the articles to the delivery station (the support 69 as shown), much in the manner as illustrated in my aforesaid application. A portion of this mechanism, when used, comprises a swinging bar 70, pivoted at 71 to the machine frame and carrying a roller stud 72 to travel through the spiral track of said cylinder cam 68 and arranged to operate a link 73 adapted for connection with a feed mechanism to bring the articles to the delivery station support 69.

Fixed to the left end of said cam shaft 55 is a cam disc 75 (Figures 12, 27 and 28) which operates the article feed plunger 76 for feeding the articles from the support 69 to the transfer member 62, through mechanism, hereinafter to be described, including the connecting rod 78 and the stud 79 (Figure 28) which operates in a closed track 80 (Figure 12) of said cam disc, the crank 81, the rock shaft 82, the crank arm 83 and the links 84 pivoted to the latter crank arm and to said feed plunger. Said cam disc 75 has also a crank stud 85 which operates through a slotted crank lever 86, the rock shaft 63, a crank arm 88 fixed to said shaft and a link 89 pivoted at one end to said crank arm and at its other end to a cross rod 90 having bearing rollers 90′ that travel in horizontal, inwardly open tracks 92 of the upper frame parts 41, before referred to. From said cross rod a duplex package ejector or pusher 94 depends to discharge the fully side-wrapped package from said transfer element 62 to the run-way 44 (Figures 9, 12, 26, 27 and 28).

98, 99 (Figures 27, 28) designate peripherally faced cams, shown in detail in Figures 22, 23, 24, 25 which, respectively, control, through rock shafts 100, 101, mounted in upstanding frame brackets 101′, the web feed and the final side fold positioning rolls 102, 103, in a manner hereinafter to be described.

105 designates a wrapper web control feed eccentric which is fixed to and rotates with the cam shaft 55, and operates, through a rocking arm 106 pivoted to a transverse shaft 107 parallel to and below the cam shaft 55 (Figures 19, 26 and 28) to control a web slack mechanism, through a connecting rod 108 and a crank arm 109 fixed to a rock shaft 110 that carries arms 111 to support and swing through an arc a slack control roll 112 to maintain proper slack in the web between the main roll W and the wrapping mechanism. A bearing roller 144 at the upper end of said lever 106 is held against the periphery of said eccentric 105 by a weight 115, the strand of which is fixed to and trained about a grooved pulley 116 which is fixed to said rock shaft 110, as best shown in Figures 19 and 26.

Side wrapping mechanism.

The transfer member 62 is shifted from one limit of its throw to the other, through the co-action of a cam roll 120 on an intermediate depending stud 121 of the transfer member operating in the aforesaid cam track 60 of disc 58, said transfer member being sustained at both limits of its throw through suitable duration intervals.

The wrapper web W′ leaves the roll W over a directing roller 123 (Figures 19 and 26) and passes thence over the slack forming roller 112, controlled by the said eccentric 105 and the weight 115. The web slack is directed from the roller 112 over the rollers 85 and 86 supported in bearings on the frame (Figures 19 and 26) and thence over a table 125 above the article support 69. When threading the web in the machine prior to the initial operation, it assumes the position shown in said Figure 6, the web passing between said table and a brake shoe 126 (Figures 1 to 8, inclusive and 19, 20, 21 and 26) which is operative in connection with the web feed mechanism to adjust the feed of the web to provide for articles of varying circumferential dimensions, and lapping folds, as will presently appear.

Figure 6 illustrates the free end *w* of the web W′ after the web has been threaded partly into the wrapping mechanism, and also after it has been severed from a previously wrapped package and has been draped in front of the article delivery station, the support 69. The article L is pushed off the support 69 onto the transfer member 62 by the pusher 76 through the pusher operating mechanism, heretofore described, and controlled by the cam disc 75. In pushing the article across the free, unattached end of the web, the terminal thereof is folded between the bottom of the article and the transfer member to produce the first bottom fold $w^2$ and to bring the front side and top folds $w^3$, $w^4$ against the front and top of the article. The article and fold $w^3$ are forced by the pusher against a spring-held presser 128 which depends from the rear end of a bar 129 (Figures 26 and 27) that slides in guide brackets 130, 131 carried by and rising and falling with the transfer member. The said presser is controlled by a spring 132 connected between a stud on said bar 129 and a stud on the guide 130 to normally hold the presser forward towards the article receiving end of the transfer member, but to permit it to be forced backwardly against the action of said spring. Rearward movement of the presser is limited by contact of a stop across pin 129' with the guide bracket 131 (Figure 26). Thereby the web is held from slipping or twisting on the article, and this engagement serves, as the article and web end are moved onto the transfer member to draw the web from the roll or other source of web supply. Figure 8 shows the article delivered fully onto the transfer member and said transfer member moving upwardly towards the entering end of the runway. Figure 1 shows the transfer member, carrying the partially wrapped article, at the limit of its upper stroke with the fold $w^5$ in place.

As the article, partially wrapped in the web, is moving forwardly and then upwardly from the position shown in Figure 7 to that shown in Figure 8, a further length of web is drawn out which eventually covers the top and rear side and a part or the whole of the bottom of the article, the latter length depending upon the length of lap of the last side fold. The article, partially enfolded in the web, moves past the two rolls 102 and 103, which preferably consist of tubes mounted to rotate freely on cross bars supported, respectively, at their outer end on the upper ends of pairs of vertically swinging arms 135, 136. Said pairs of arms are respectively fixed at their lower ends to and partake of the rocking movement of the rock shafts 100, 101, as will presently appear. The roll 102 is timed to swing forwardly against the looped portion of the web, beneath the article before the wrapper of one article is severed from the web, so as to thereby draw off a length of web for the first or initial stage feed of a succeeding article. Before the wrapper, enfolded on an article, is severed from the web, the article will have been forced onto the run-way to pinch the trailing bottom fold $w^6$ between the article and the runway to avoid slackening of the wrapper, under the tension on the article, and thereby avoid displacement of the overlapping folds on each other and waste of wrapper material which would result from such slackening. As herein shown, the web is severed by drawing it across a severing knife 138 that is carried by and is beneath the rear end of the transfer member, the roll 102 for this purpose moving rearwardly past and beneath said knife. The length of the initial feed of the free end of the web is controlled by the co-action of the web feed roll actuating mechanism and of the brake shoe 126, as will more fully hereinafter appear.

The other roll 103 serves as a means to lay the final bottom flap $w^6$ beneath the free end of the transfer member, so that it will be folded or ironed between the article and the runway bottom 44 when the article is forced thereonto, as indicated in Figures 1 to 4, inclusive. The throw of this roll 103 is adjustable, as will presently appear, to vary the length of the last overlap $w^n$. Said roll 103 plays, during swinging movement of its arms 136, in a short arc between the cutting knife 138 and the free end of the transfer member and, by the adjustment referred to, its throw can be varied to produce varying lengths of the last fold lap as desired.

The swinging web feed movement of the roll 102 is controlled by the action of the cam disc 98 and a spring 140 (Figures 19, 22 and 23) that is stretched between a fixed part of the machine frame and a lug 141 rigid with one of the arms 135, and also with a crank arm 142 to which is pivoted one end of a cam rod 143, the other end of said rod carrying a stud for a cam roll 144 which travels on the suitably shaped periphery of said cam 98. The latter end of the cam rod 143 is sustained by the upper end of a pivoted arm 145 which rocks on the beforementioned shaft 107. The web feed roll 102 occupies its normal, nonfeeding position (Figures 5 to 8) when the cam roll 144 is traveling on the concentric periphery of the disc and is swung through its feeding position and is returned when the cam roll drops into the eccentric portion of the controlling disc 98. This feed throw, as shown, is a constant length throw, the length of the initial feed being governed by the action of the brake shoe when the web is pinched between it and the brake plate or table 125, as hereinafter described.

The swinging movement of said final fold laying roll 103 and the carrying arms 136 are controlled by the aforesaid cam 99 and a contractile spring 150. Said spring is stretched between a fixed part of the frame and a crank lug 151 rigid with the rock shaft and arm 136, and a cam rod 153 is pivoted at one end to one of said arms 136 and carries at its other end a stud for a cam roll 154 which bears against the periphery of the cam disc 99. The cam rod 153 is sustained at its roll end by a pivoted arm 155 which rocks on the said shaft 107. The pivotal connection of the cam rod 153 to one of the arms 136 is an adjustable one to vary the throw of the roll 103 to correspond with the width of the article and the extent of overlap of the last bottom fold $w^6$. Such connection is shown as a pin and slot connection. The slot 156 constituting part of said connection is curved on an arc whose center is the axis of rotation of the roll 154 when the parts are at rest with the fold forming roll 103 at its rearmost position, as shown in Figure 24. Thereby is provided means to vary the throw of the roll 103 forwardly from the rearmost position of said roll, and correspondingly vary the extent of overlap of the last side fold of the web, and of the wrapper after it has been severed from the web.

The normal rearmost positions of the rolls 102, 103 are shown in Figures 1, 5, 6, 7, 8, 10, 12, 24 and 26 and in the positions shown in Figures 1, 2 and 8 serve to guide the web on and tension it about the article. When the article reaches the level of the runway 44, the pusher 94 is operated, through its connection to the crank stud 85 of the disc 75, to eject the article onto said runway,—a position indicated in Figure 2. The roll 103 at this time moves forwardly to lay the part of the web which afterwards constitutes the last fold $w^6$, and which is pinched between the runway and the bottom of the article, so that thereby the article is wrapped on all sides in the end of the web, and the folds are tension held between the article and surfaces of the wrapper elements and beneath the transfer member (Figure 2) to a position to produce the desired width of final underlap fold $w^6$ after the web has been severed and said fold is ironed between the article and runway in the continued movement of the article on said runway. A longer length of such underlap is determined by the adjusting throw of the carrying arms 136 of said roll 103. While the roll 103 is thus moving beneath the transfer member, the web can be drawn forwardly by the rolls 102, 103, and just before the position shown in Figure 3 has been reached, the clamping shoe presses the web against the table 125 to arrest further feed of the web from its source of supply. Thereafter during the continued movement of the roll 102, and the roll 103 so far as it is adjusted to move, the web is brought against the edge of the knife 138 to sever the wrapper from the web, in the free end of which the article has been wrapped; and the web is, by the means described, tensioned on the article so that it will not slack thereon when the web is severed. The continued movement of the roll 102 throws down the free, unattached end of the web to the position shown in Figure 4, and thereafter said free end of the web is draped during the descending movement of the transfer member in front of the support 69 to be in the path of the next article that is forced from said support to said transfer member, as best shown in Figures 5 and 6.

As the wrapped articles are moved rearwardly over the runway, the overlapping folds of the wrapper are pressed together by the weight of the article, assisted when necessary, by known pressure means. If the wrapper web be of a self-sealing nature, said folds may be heat-sealed when passing through the runway. Likewise, end flaps when used may be so sealed. When the overlapping folds and end flaps are to be pasted together, suitable pasting means will be employed to apply the paste or glue before the folds and flaps are brought together. The rear end of the runway preferably drops so that gravity assists the ejector pusher 94 to facilitate the movement of the wrapped articles off the runway.

Referring now to the mechanism for operating and for adjusting the operation of the web brake to correspond to varying wrapping conditions, such as the dimension of the articles, said mechanism is best shown in Figures 9, 10, 19, 22, 23 and 28, and is made as follows:

The brake shoe 126 is fixed to the rear end of an arm 160 that is in turn fixed to a rock shaft 161 mounted in a bearing carried by a frame upright member 40. A torsion spring 162, connected between the machine frame and a collar 162' on said shaft normally tends to press the brake shoe towards the table 125 to pinch the web between said parts. Said shaft 161 also loosely carries pinch eccentrics 163 confined between the heel of the arm 160 and collars pinned to said shaft, the eccentrics serving to hold the web from slipping backwardly at all times.

Said rock shaft 161 is operated to swing the brake shoe from the table 125, against the action of said spring 162, by means of a crank arm 165 (Figures 12 and 19) connected to said rock shaft 161 and carrying a cam roll 166 on its forward end which engages the periphery of a rocking cam 167 that is pivoted to the machine frame at 168 (Figures 12, 19 and 28). Said rocking cam 167 is caused to rock back and forth on its pivot 168 by a connecting rod 170. It is pivoted at 171 to the upper end of the crank arm 142 that carries one end of the cam rod 143, before described, and is connected to the rocking cam 167 through a pivot stud 172' that extends into and is adjustable in an arcuate slot 172, the center of which is at 168. Said rocking cam 167 has a lower or peripheral portion 173 which, when the roll 166 is lying thereon, permits the brake shoe to drop on the web in braking action, under the influence of its spring 162, and to thereby arrest web feed (Figure 19). When the roll 166 engages a higher peripheral portion 175 of said rocking cam, it raises the brake shoe 126 off the web and permits free web feed (Figure 12). Adjustment between the constant throw mechanism for the web feed roll 102 and said brake shoe, to correspond to different dimensioned articles to be wrapped in the free end of the web, consists in shifting the pivot of the rod 170 along the slot 172 of the rocking cam 167 and angularly with respect to the rocking axis 168 of said rocking cam.

End tucking and folding mechanism.

The mechanism for tucking and folding the portions of the web and wrapper that extend endwise beyond the ends of the articles to produce end flaps and to lay them against the ends of the package is best shown in Figures 14 to 18 inclusive, and Figures 26 and 27, and is made as follows:

180, 180 designate a pair of vertically disposed tucker blades arranged one near each side and above the transfer member 62, and between which the partly wrapped articles are pushed as they are forced onto the transfer member by the pusher 76. Said tucker blades are free at their rear ends and are fixed at their forward ends to heads 181 having outstanding supporting guide and supporting rods 182, 183 which slidingly extend through openings in the free ends of supporting and operating arms 184 (Figures 14, 15 and 27). The locking rods 182 are locked to said arms by set screws 186. Said guide and supporting rods fixedly hold said blades to said arms and also permit relative lateral adjustment of the blades to said arms to adapt the blades to different lengths of articles. Said arms 184 are pivoted at their front ends to pins 188 which rise from bosses constituting parts of the pivot of the transfer member, whereby the said tucker blades partake of the swinging movements of the transfer member. Said bosses are shown as transversely slotted in Figures 14, 16 and 27 to fixedly receive said pins in any suitable manner, whereby the range of swing of said arms 184 and the said folding blades can be varied.

190, 190 designate a second pair of end flap folding and tucker blades, parallel to the blades 180, and hinged at their rearward ends by pivot studs 191, constituting parts of castings 192, that are fastened to the rear ends of said tucker blades. The said studs 191 engage in slots 195 of the cross frame bar 41' (Figures 26 and 27), whereby the pivot supports for the rear ends of the latter tucker blades can be adjusted towards and from each other, with the like pivot adjustment of the blades 180, to adjust the machine to articles of different lengths. The front ends of the blades 190 overlap the blades 180 to constitute continuous limiting and guide walls for the articles when traveling on the transfer member and on the rearward part of the runway.

The tucker blades 180 are provided between their ends with fixed, exterior, upstanding curved bars 195 which lie inside of and are adapted to be engaged by lugs 196 that are fixed to the lower margins of the forward ends of the tucker blades 190, (Figures 16, 26 and 27). There is thus formed a connection between the two pairs of tucker blades which will cause them to mutually interact one pair upon the other, and thereby simultaneously spread apart and move together about their respective pivots. The free ends of said tucker blades are normally held inwardly towards each other through the engagement afforded by said bars 195 and lugs 196 in all positions of the loaf lifter, by a cross-spring 208 (Figure 27) that is stretched between and anchored to said fittings 192 in front of the pivots 191. The ultimate inward movement of said blades are limited by adjustable stops 209 rising from the transfer member and adapted for engagement with said horizontally swinging arms 184 when in their innermost positions, as shown in Figures 14 and 27.

The said arms 184 are swung outwardly to spread the ends of the tucker blades 180 and 190 by means of the before-mentioned lateral cam ribs 65 on the cam disc 58, said cam ribs engaging bearing rolls 210 mounted on inwardly extending lugs 211 of the arms 184 (Figures 14, 15, 16, 17 and 27). Said ribs are so located on said cam disc 58, with respect to the operation of co-operating parts of the machines, as to spread said tucker blades 180 and 190 in the manner indicated in Figure 15, just before the web-wrapped article is transferred onto the transfer member by the pusher 76. Figure 15 indicates the manner in which the tucker blades 180 first engage the overhanging tubular end flaps which are formed up and extend beyond the article ends during the side wrapping thereof, such engagement being at a time when the blades 180 are spread widest apart. In the continued rotation of the cam disc 58, the cam ribs 36 pass off the rolls 210 to permit the spring 208 to swing the free ends of the tucker blades inwardly, until arrested by engagement of the stops 209 with the swinging arms 184 or by an interposed wrapped or partially wrapped article.

The transfer member and the tucker blades carried thereby are in the positions indicated in Figures 15 and 16 at the time an article is pushed from the support 69 onto the transfer member. The free, rear edges of the tucker blades 180 act, when the article is forced onto said transfer member, to fold the front walls of the tubular extensions of the wrapper into the position shown in Figures 17 and 29 to produce the resultant end flaps $w^8$; and the lower edges of said tucker blades 180 also produce the bottom part flap $w^9$ while the top parts are formed above the top edges of said blade 180 to produce the part flap $w^{10}$ (Figure 29). During this time the first bottom fold $w^2$ is being formed by laying the free end of the web between the article bottom and the transfer member. When the partially wrapped loaf, with the partially tucked and folded end flaps, is being advanced fully onto the transfer member and said member 62 is being raised from the position indicated in Figure 7 to the position indicated in Figure 8, such raising of the rear end of said transfer member causes the upper flap part $w^{10}$ to be tucked down between the blade 180 and blades 190. These positions of the part flaps $w^9$, $w^{10}$ are shown in Figure 30. During the down-fold of the flaps $w^{10}$, there are formed on the rear folds endwise extending part flaps $w^{11}$ which pass upwardly through the oblique slots 217 of the blades 190 by which said latter part flaps are folded toward the blade 190; the part flaps $w^{10}$ and $w^{11}$ constituting the full top flap $w^{12}$. Said part flaps $w^{11}$ and rear flap $W^{13}$ are folded fully against the article ends by the rear walls of said slots 217 when the article is pushed from the transfer member onto the runway, the part flaps $w^{10}$, $W^{11}$ producing full stop flap formations $w^{12}$, as shown in Figures 31 and 32, and the parts $w^{13}$ producing the full front flaps $W^{13}$. During the same rearward movement of the partially wrapped article, the bottom flap parts $w^9$, $w^{14}$, the latter produced when passing the rear edge of the slot 217, are folded upwardly by the blade 190 to produce the last end flap $w^{15}$, being folded between the lower, oblique margins of the blades 190 and the opposed top edges of plates 220 that lie beneath the blades 190 (Figure 26). During the rearward movement of the article onto and over the runway, the last side fold $w^6$ is folded between the article and said runway, and is caused to lap upon the first side fold $w^2$, as clearly shown in Figures 3 and 4. The folding of said flaps $w^{15}$ and the side folds $w^6$ complete the end folding of the article.

The forward ends of the plates 220 are inset into short, lateral recesses 220′ (Figures 26 and 27) so as to bring the upper edges of said plates, which bound the lower sides of the slots 218, flush with the entering upper face of the runway, and also to permit said plates 220 to be adjusted towards and away from each other relatively to said runway bottom, as will hereinafter appear.

The wrapped articles thereafter are pushed rearwardly through the runway. If the bottom flap and the end flaps are to be pasted, the paste (which will have been theretofore applied in any suitable manner) will dry as the loaves are forced through said runway, and for this purpose the bottom and side walls of said runway may be made of open work construction as indicated at 223, 224 in Figures 26 and 27. If the web be wax-impregnated and the sealing be effected by a heater to fuse the wax in the overlying parts thereof, a heater device may be arranged in the runway.

Such a heater device is shown in Figures 26 and 27. It comprises a bottom heater 225 to engage with the overlapped first and last folds of the circumferential wrapper, and end heaters 226 against which the end flaps are engaged as the loaves pass the heater. The parts described constitute a channel-shaped runway, the walls of which hold the overlapping folds and flaps together and against the article until the sealing or paste medium is set.

It has heretofore been explained that in the side wrapping operation, after the initial feed of the web has been effected, the length of web to complete the side and the predetermined overlaps will be automatically determined, inasmuch as the web is drawn toward the loaf during the wrapping operation, and only so much web is drawn to the article as is needed to side wrap it, with the proper overlapping at the folds, It is one of the purposes of the present invention to produce a machine which will be universal to efficiently wrap articles of different widths, heights and lengths within the law of the limits of a given machine. Such mechanisms, therefore, call for adjustment for different lengths of articles within limits, and the embodiment of the invention herein shown permits of length adjustment of wide ranges, as from eighty to one hundred per cent variation.

The means herein shown for adjusting the different parts of the end folding mechanism to provide for different lengths of loaves embrace the means for mounting the fittings 181 on the rear ends of the swinging arms 184 through the locking and guide rods 182, 183 referred to, and the means for varying the distance apart of the pivot studs 191 in the slots 195 of the bar 41′ which carry the blades 190, and also the means for varying the distance between the side walls of the runway, including means to adjust the seal heater, or other form of package closer, to correspond with said adjustments for length of the articles being wrapped.

The means for varying the distances between the mountings for the tucker blades 180 and 190 has been described, and the means for varying the distance between the runway sides, including the proper relative adjustment of the sealing heater, will now be described.

The bottom heater element 225 of the heat sealing device is made of a length to extend throughout the full length required by the article of the greatest length which will be wrapped and sealed, and the upstanding or end heater element 226, as well as the side members 220 and 223 of the runway are adapted to be moved inwardly and outwardly, as units, through the medium of a right and left hand screw 235 (Figures 26 and 27) which extends through nuts 236, 236 that are carried by and are, in suitable manner, movable with the exterior frames 237, to which the plates 220, the end heater elements 226 and the walls 223 at the sides of the runway. Said shaft 235 is rotatively mounted in bearings 238 carried by the machine frame in a manner to be axially fixed in said bearings. The shaft is provided with a hand wheel 239 by which to rotate it and to thereby adjust the sides of the runway toward and from each other. Preferably, cushioning springs 240 are interposed between said frames 237 and the end heater elements to permit yielding mounting of said adjustable parts and to effect moderate pressure thereof on the end flaps of the wrapper while the same is under heat, and while the same is being cooled.

In order to mechanically centralize the article in the machine, there is employed an equalizer device between the pivoted ends of the arms 184 to cause the rear ends of said arms, which carry the blades 180, and which control the blades 190, to be always maintained at equal distances from the center line of the machine. Thereby is insured equal inward and outward movements of said blades 180 and 190 to receive the articles centrally on the transfer element and to deliver the articles centrally on the runway. Such equalizer devices may assume various forms to produce this result. As shown the pivoted ends of the arms 184 have inward extensions 241, 242, which overlap at their meeting ends. One of said extensions (241) carries a stud 243 which projects with a working fit into a slot 244 of the other extension 242. Said slot is parallel to a vertical plane passed through the pivot studs 188. It is, therefore, evident that swinging movements of one arm 184 and its blade 180 produce like and equal movement of the other arm and its blade. The end of the stud 243 which plays through said slot may be eccentric to the lower anchored end, in order to accurately install said equalizer and to overcome inaccuracies in machinery and wear at the pivot (Figure 18³). It is to be understood that other equalizing mechanisms may be employed for producing the same symmetrical disposition of the end flap folding blades, such for instance as interacting gears on the arms 241, 243.

It will also be observed that by fastening the stops 209 in transverse slots 209' (Figures 14, 15 and 26), the range of swinging movement of the arms 184 and the blades 180 and 190 can be varied. This construction, taken in connection with the slotted attachment of the pins 188 with the swinging lifting element permits delicate adjustments of the end flap folding blades, through a considerable range, and thus introduces universal characteristics in the machine for different length packages which are quite unusual and of great utility.

To properly guide webs of different widths in the various adjustments for article lengths, it is desirable to use the gauge device shown in Figures 20 and 21. As therein shown, 246 designates a shaft which extends across and rotates in bearings 247 rising from the table 125. Said shaft has right and left hand threads which engage nuts 248 that slide inwardly and outwardly on said table. Said nuts are formed with edge gauges 249 to engage the edges of the web, and they are adapted to be moved towards and from each other for that purpose through rotation of said shaft 246.

While the illustrative embodiment of my invention has been shown and described in considerable detail, it will be understood that the structural details may be varied within the spirit and scope of the invention. For instance, the means for varying the extent of overlap of the folds on the bottom of the article, operating in connection with the severing knife, may have other forms than the swinging member shows as; for instance, a movable block that normally shields the knife and is moved away from the knife edge at the time of severance through timed and operative connection with the mechanism which operates the fixed throw web feed roll.

I claim as my invention:—

1. A wrapping machine comprising mechanism to fold a wrapper circumferentially about an article, and mechanism to form and fold end flaps on the article when the article and its wrapper are moved through the same, means for moving the article and its wrapper through said mechanism combined with equalizer means to maintain the article in its movement through the end folding mechanism centralized with respect to said mechanisms.

2. In a wrapping machine, pivoted members to confine and serve as guiding and holding means for the article and wrapper while wrapper end flaps are being folded on the ends of the package, and pivoted equalizer means to maintain the article centered with respect to the longitudinal center of the end folding position of the articles in the machine.

3. In a wrapping machine, end flap folding blades between which the article being wrapped is advanced, said blades being constructed and arranged to serve as guides for the article during its advance, and mutually acting equalizer means to center said blades relatively to the center line of the end flap folding position of the article in the machine.

4. In a wrapping machine, end flap folding blades between which a forming package is movable during end flap folding, means for moving such a forming package between the blades in the direction of their length and positively acting equalizing means associated with said blades to maintain them symmetrically to the center line of the end folding mechanism.

5. In a wrapping machine, end flap folding blades arranged with their flat sides facing each other with means to support them to permit the blades to swing toward and from each other, spring means tending to move said blades toward each other and equalizing means acting on the blades to maintain them symmetrical in their swinging movement relatively to the center line of the end folding mechanisms.

6. In a wrapping machine, end flap folding members adapted to form end flaps on an article and a wrapper moving between the same, means for moving such article and its wrapper between said members, pivoted arms carrying said members, and means fixed to said arms at their pivots and mutually interacting to maintain said arms symmetrical relative to a plane lying between the arm pivots.

7. In a wrapping machine, end flap folding blades, pivoted members by which they are carried, means to adjust said pivots from and toward each other, and means to adjust said blades toward and from each other on said members.

8. In a wrapping machine, end flap folding blades, pivoted members by which they are carried to permit the blades to swing toward and from each other, stop means for said members, and resilient means tending to swing said members toward said stop means.

9. In a wrapping machine, end flap folding members to engage and fold end flaps of a package passing therebetween, pivoted members by which said members are carried, stop means for said members, and means to adjust said stop means transversely of the pivotal movement of said members.

10. In a wrapping machine, end flap folding blades, pivoted members by which they are carried, including carrier members to which the blades are directly attached, and means for adjusting the carrier members toward and from said pivoted members.

11. In a wrapping machine, end flap folding blades between which a forming package is movable during end flap folding, a pair of pivoted arms, and heads carried by and adjustable toward and from said arms to which said blades are attached.

12. In a wrapping machine, end flap folding blades between which a forming package is movable during end flap folding, a pair of pivoted arms, members to which said blades are attached and by which they are carried, and means to adjust said members toward and from said arms and to lock them in adjusted positions.

13. In a wrapping machine, end flap folding blades, a pair of pivoted arms, members carrying said blades, and guide and adjusting members extending between said members and said arms to adjust said blades toward and from each other.

14. In a wrapping machine, end flap folding blades, a pair of pivoted arms, members carrying said blades, and each provided with parallel stems adapted for sliding and guiding movement relative to its arm, and means for fastening one of said stems of each pair to its arm.

15. In a wrapping machine, end flap folding blades, means to pivot them to swing toward and from each other, and means to adjust their pivot means toward and from each other.

16. In a wrapping machine, a pair of end flap folding blades extending in the general longitudinal direction of the machine, pivoted members by which they are carried, means to adjust said blades on said members relatively toward and from each other, and equalizer means to maintain said blades symmetrical relatively to the center of the end folding position in the machine.

17. In a wrapping machine, a pair of end flap folding blades, extending in the general longitudinal direction of the machine, pivoted members, on corresponding ends of which said blades are carried, means to adjust said blades on said members relatively toward and from each other, and equalizer means rigid with said members and coacting with each other to equalize their swinging movements about their pivots.

18. In a wrapping machine, end forming and folding flap blades, arms swinging on the machine about pivots which are adjustable toward and from each other, and members to which said blades are directly attached having means to fix them and to adjust them laterally toward and from said arms.

19. A wrapping machine comprising mechanism to circumferentially fold a wrapper about an article, and end flap folding means including blades having pivot means to permit them to swing toward and from each other, and means for adjusting said pivot means toward and from each other.

20. A wrapping machine for wrapping an article in the free end of a web, comprising mechanism through which the article and the free end of the web are caused to be moved to draw the web on and wrap the article in it, pivoted end flap forming elements to form and fold end flaps against the package, and means to adjust the pivots of said elements toward and away from each other.

21. A wrapping machine for wrapping an article in the free end of a web, comprising mechanism through which the article and the free end of the web are caused to be moved to draw the web on and wrap the article in it, swinging end flap forming and folding means serving also as guides during the passage of the article, and equalizer means acting on said latter folding means to center the package relative to the longitudinal center line of the end flap folding means.

22. A wrapping machine comprising mechanism to circumferentially wrap an article within the free unattached end of a web, pivoted end flaps forming and folding blades spring-pressed toward each other and toward the ends of the article, operative to partially form and fold the end flaps against the article ends during the circumferential wrapping, and means to adjust the pivots of said blades toward and from each other.

23. A wrapping machine comprising mechanism to circumferentially wrap an article within the free unattached end of a web, and flap forming and folding means to form and fold end flaps against the end of the article and operative to partially form and fold said end flaps against the article ends during the circumferential wrapping, said forming and folding means serving also to guide the article in its movement through the machine and equalizer means acting on said end flap forming and folding means to maintain the latter symmetrical to the center line of said end flap forming and folding means.

24. A wrapping machine comprising a frame, a runway thereon over which wrapped articles are discharged, a support for an article to be wrapped, a transfer member to transfer an article and the free end of a wrapper web from said support in line with said runway, means to transport the article from said transfer member to said runway, means whereby the article is circumferentially wrapped in said free end of the web during its movements from said support to said runway, end flap forming and folding elements at the sides of the runway and said transfer member, when the latter is in line with said runway, to form and to fold end flaps against the ends of an article, said end flap folding elements comprising blades which are pivoted and are held toward the article ends, and means to adjust said blades toward and from each other and to hold them in adjusted positions.

25. A wrapping machine comprising a frame, a runway thereon over which wrapped articles are discharged, a support for an article to be wrapped, a transfer member to transfer an article and the free end of a wrapper web from said support in line with said runway, means to transport the article from said transfer member to said runway, means whereby the article is circumferentially wrapped in said free end of the web during its movements from said support to said runway, end flap forming and folding elements at the sides of the runway and said transfer member, when the latter is in line with said runway, to form and to fold end flaps against the ends of an article, said end flap folding elements being pivoted and spring-held toward the article ends, and means to adjust said pivots toward and from each other.

26. A wrapping machine comprising co-acting article wrapping and web feeding mechanisms to wrap an article in the free end of a web, end flap forming and folding mechanisms to form and to fold end flaps against the ends of an article, said latter mechanisms embracing pairs of blades, spring-held toward each other, pivoted in the machine and extending at their free ends toward and overlapping each other, and means to adjust the blades of each pair toward and from each other and to lock them in adjusted positions.

27. A wrapping machine comprising mechanisms for folding a wrapper circumferentially about an article, with the edges projecting from the article ends, and end flap folding means for forming and folding end flaps from the projecting margins including two pairs of swinging blades, the blades of the two pairs overlapping at their free ends, laterally adjustable pivots carrying the blades of one pair, pivoted arms carrying the blades of the other pair, laterally adjustable connections between the latter blades and the free ends of said arms, spring means tending to swing said blades toward each other, and co-acting means on said blades to cause said arms to mutually swing under and in opposition to said spring means.

28. A wrapping machine comprising mechanisms for folding a wrapper circumferentially about an article, with the edges projecting from the article ends, and end flap folding means for forming and folding end flaps from the projecting margins including two pairs of swinging blades, the blades of the two pairs overlapping at their free ends, laterally adjustable pivots carrying the blades of one pair, pivoted arms carrying the blades of the other pair, laterally adjustable connections between the latter blades and the free ends of said arms, spring means tending to swing said blades toward each other, coacting means on said blades to cause said arms to mutually swing under and in opposition to said spring means, and means acting on said arms to spread said blades away from each other in opposition to the action of said spring means.

29. In a wrapping machine, end flap forming and folding blades, a pair of pivoted, spring-restrained arms carrying said blades and a rotative element between said arms having spreading cams to swing said arms and said blades in opposition to their spring restraint.

30. In a wrapping machine, end flap forming and folding blades, a pair of pivoted, spring-restrained arms carrying said blades, a pusher for transporting a partially wrapped article between said blades, and a rotative member having spreading cams to swing said arms and said blades in opposition to their spring restraint.

31. In a wrapping machine, the combination with means to circumferentially fold a wrapper about an article, including a support, a runway and a transfer element to carry the wrapper and article from said support to said runway, of end flap forming and folding means to fold end flaps upon the ends of the article, including swinging blades spring-held toward the article ends, and a rotative member equipped with means to operate said transfer element and to control said blades.

32. In a wrapping machine, a mechanism to wrap an article in the free end of a web, including swinging means movable in an arc across the path of the article while an article is partially wrapped within said free end, means to complete circumferential wrapping of the article in said free end, and means operating in timed relation to said swinging means to control the amount of overlap of the wrapper folds on the article.

33. In a wrapping machine, a mechanism to wrap an article in the free end of a web, including swinging means movable in an arc across the path of the article while an article is partially wrapped within said free end, means to complete circumferential wrapping of the article in said free end, and swinging means operative in timed relation to said first swinging means to vary the overlap of the wrapper folds on the article.

34. In a wrapping machine, a mechanism to wrap an article in the free end of a web, including swinging means movable in an arc across the path of the article while an article is partially wrapped within said free end, means to complete circumferential wrapping of the article in said free end, means operating in timed relation to said swinging means to control the amount of overlap of the wrapper folds on the article, and means to vary the throw of said control means.

35. In a wrapping machine, mechanism to wrap an article in the free end of a web, including swinging means to drape the web in the path of the article while an article is partly wrapped in said free end, means to force said article across said web and through said mechanism to complete circumferential wrapping of the article and means to sever the wrapped package from the web.

36. In a wrapping machine, mechanism to wrap an article in the free end of a web, including swinging means having a fixed throw to place the web in the path of the article while an article is partly wrapped in said free end, means to transport said article across said web and through said mechanism to complete the circumferential wrapping of the article, and means to sever the wrapped package from said web.

37. In a wrapping machine, mechanism to wrap an article in the free end of a web, including swinging means having a fixed throw to place the web in the path of the article while an article is partly wrapped in said free end, means to transport said article across said web and through said mechanism to complete the circumferential wrapping of the article, means to variably control the amount of overlap of the wrapper folds on the article, and means to sever the wrapped package from said web.

38. In a wrapping machine, mechanism to wrap an article in the free end of a web, including swinging means having a fixed throw to place the web in the path of the article while an article is partly wrapped in said free end, means to transport said article across said web and through said mechanism to complete the circumferential wrapping of the article, web brake means and operative connections between said web brake means and said fixed throw means, and means to sever the wrapped package from said web.

39. In a wrapping machine, mechanism to wrap an article in the free end of a web, including swinging means having a fixed throw to place the web in the path of the article while an article is partly wrapped in said free end, means to transport said article across said web and through said mechanism to complete the circumferential wrapping of the article, web brake means and operative connections between said web brake means and said fixed throw means, and means to sever the wrapped package from said web, there being an adjustment in said operative connections to vary the length of web feed.

40. In a wrapping machine, mechanism to wrap an article in the free end of a web, including swinging means having a fixed throw to place the web in the path of the article while an article is partly wrapped in said free end, means to transport said article across said web and through said mechanism to complete the circumferential wrapping of the article, web brake means, operative connections between said web brake means and said fixed throw means, means to sever the wrapped package from said web, and freely rotative limiting eccentrics acting on the web to avoid back movement of the web at all times.

In witness whereof I claim the foregoing as my invention, I have hereunto subscribed my name at Syracuse, county of Onondaga, and State of New York, this 26th day of December, 1923.

HARRY Y. ARMSTRONG.